J. HORVÁTH.
COMBINED MILK BOTTLE RECEPTACLE AND MAIL BOX.
APPLICATION FILED JUNE 23, 1921.

1,417,382.

Patented May 23, 1922.

2 SHEETS—SHEET 1.

Inventor
J. Horváth

By H. K. Bryant
Attorney

J. HORVÁTH.
COMBINED MILK BOTTLE RECEPTACLE AND MAIL BOX.
APPLICATION FILED JUNE 23, 1921.
1,417,382.
Patented May 23, 1922.
2 SHEETS—SHEET 2.
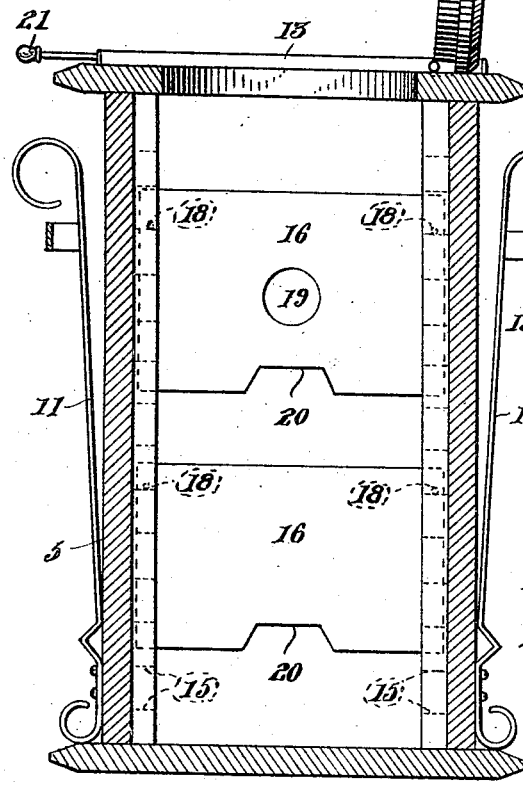
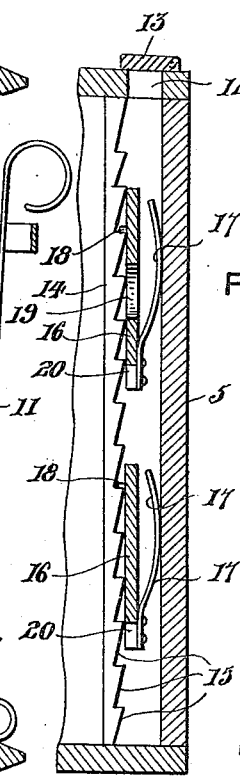
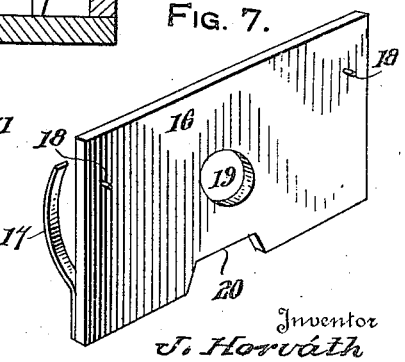
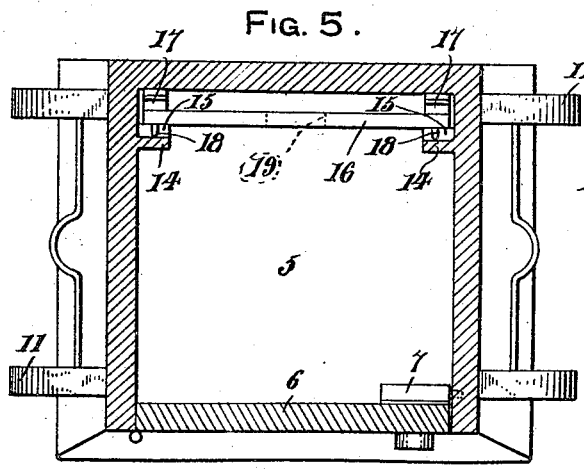
Inventor
J. Horváth
By H. Bryant
Attorney

UNITED STATES PATENT OFFICE.

JOZSEPH HORVÁTH, OF SOUTH BETHLEHEM, PENNSYLVANIA.

COMBINED MILK BOTTLE RECEPTACLE AND MAIL BOX.

1,417,382.

Specification of Letters Patent.  Patented May 23, 1922.

Application filed June 23, 1921. Serial No. 479,879.

*To all whom it may concern:*

Be it known that I, JOZSEPH HORVÁTH, a citizen of Hungary, residing at South Bethlehem, in the county of Northampton and State of Pennsylvania, have invented certain new and useful Improvements in Combined Milk-Bottle Receptacles and Mail Boxes, of which the following is a specification.

This invention relates to certain new and useful improvements in combined milk bottle receptacles and mail boxes, and has particular reference to the provision of a milk bottle receptacle provided with top and side openings respectively for the introduction and removal of milk bottles and respectively provided with automatic and key actuated locking means whereby access to the milk bottles may be only had by an authorized person whereby theft of the milk is prevented.

An important object of the invention is to provide a simplified means for utilizing a small portion of the milk bottle receptacle for the reception of letters which may be readily inserted but which can only be removed by operating the key actuated lock of the side door.

Another object of the invention is to divide the receptacle into a mail receiving compartment by means of adjustable partition members which may be set to prevent falling of the mail into the milk bottle compartment and which may be raised to permit ready removal of the mail when desired.

With the above general objects in view and others that will appear as the nature of the invention is better understood, the same consists of the novel form, combination and arrangement of parts hereinafter more fully described, shown in the accompanying drawings and claimed.

Figure 1:
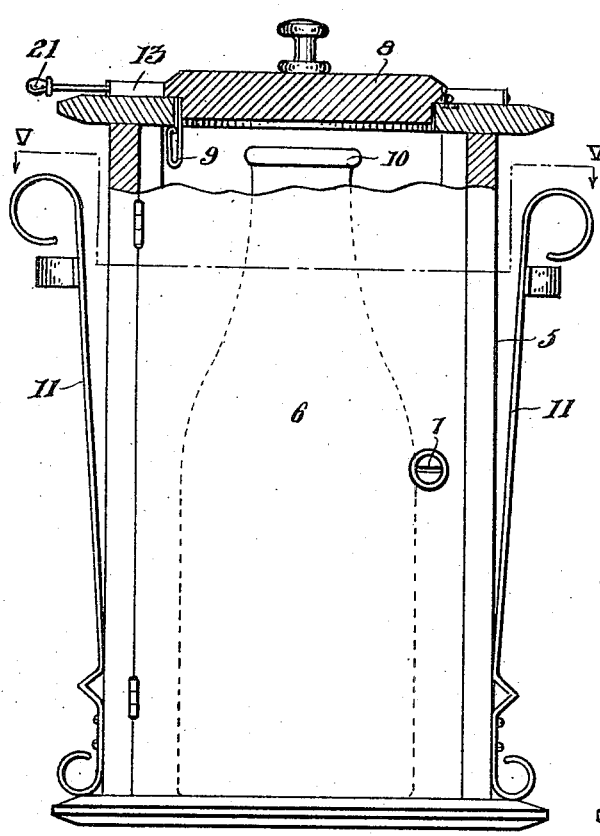
Figure 3:
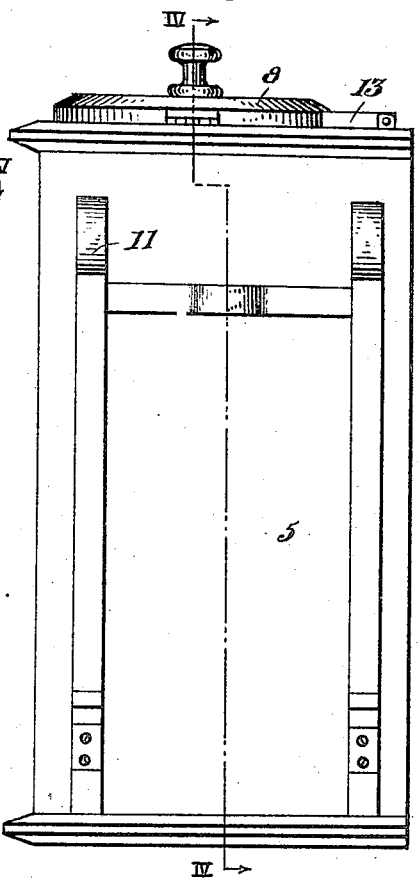
Figure 2:
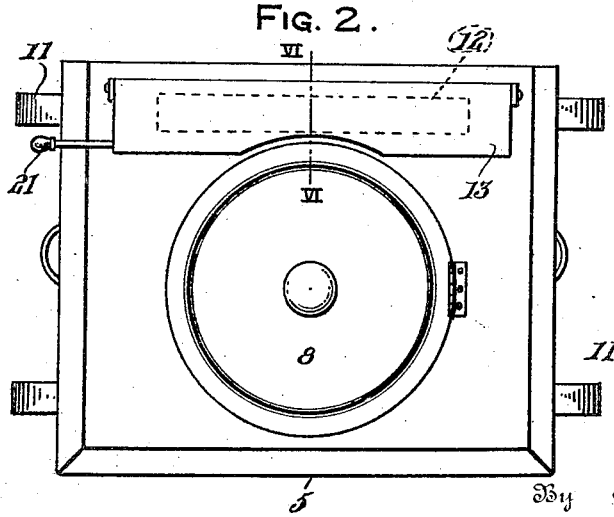

In the drawings, wherein like reference characters designate corresponding parts throughout the several views, Figure 1 is a view partly in front elevation and partly in vertical section of a combined milk bottle receptacle and mail box constructed in accordance with the present invention, Figure 2 is a top plan view of the device shown in Fig. 1, Figure 3 is a side elevational view thereof, Figure 4 is a vertical sectional view taken upon line IV—IV of Fig. 3, Figure 5 is a horizontal sectional view taken upon line V—V of Fig. 1, Figure 6 is a vertical sectional view taken upon line VI—VI of Fig. 2, and Figure 7 is a perspective view of the upper sliding partition.

Referring more in detail to the several views, the invention embodies a receptacle of vertically elongated form and preferably of rectangular shape in cross section generally denoted by the numeral 5 and composed of top, bottom, side and back walls and a hinged front door, the door being denoted by the numeral 6 and provided with a key actuated locking device 7 of any desired form. The top wall is provided with a circular opening adapted to be closed by a hinged cover 8, and the cover 8 is provided with a spring catch 9 at a point opposite the hinge of the same adapted to automatically snap behind the under surface of the top wall when said cover is closed so as to maintain the same in closed position, the catch 9 being only releasable by gaining access to the interior of the receptacle 5 through the opening of the door 6. Thus, when the milk bottle 10 is inserted through the opening in the top wall of the receptacle 5 and placed upon the bottom of the latter, the cover 8 is closed and the milk bottle can only be removed by the use of a proper key in the locking device 7 for opening the door 6, whereupon said milk bottle may be withdrawn through the front opening of the receptacle 5. In the use of the present device the doors are both normally in closed position and the consumer and dairyman are each provided with a key for the locking device 7.

Suitable resilient clips 11 may be attached to the sides of the receptacle 5 for holding newspapers or the like. At one side of the cover 8, the top wall of the receptacle 5 is provided with an elongated slot 12 adapted to be closed by a hinged flap 13 for excluding dust or other foreign matter, and the slot 12 communicates with the interior of the receptacle 5 near the back wall of the same, while a pair of inwardly projecting guide flanges 14 are provided upon the side walls of the receptacle 5 in spaced relation to but adjacent the back wall of said receptacle 5. The guide flanges 14 are provided with ratchet teeth 15 upon their rear faces and a pair of slidable partition sections 16 have their ends resiliently held into contact with the flanges 14 by means of sheet metal springs 17 carried by the ends of said partition sections and bearing upon the back wall of the receptacle 5, the partition sections being provided with forwardly projecting pins 18 arranged to engage the ratchet teeth 15 so as to maintain the partition sections in the desired vertically adjusted position to which they may be set. It will be apparent that when the flap 13 is opened, envelopes, postal cards or other like mail matter may be inserted through the slot 12 between the back wall of the receptacle 5 and the partition sections 16 and with the lower section 16 positioned near the bottom of the receptacle 5, the mail will be prevented from falling inwardly where the milk bottle is to be positioned. On the other hand, by pressing rearwardly on the partition section 16 against the action of the springs 17, the pins 18 will be disengaged from the ratchet teeth 15 for permitting adjustment of the partition sections to the desired lowered point while by simply pushing upwardly on the partitions 16, they may be sufficiently elevated to permit ready withdrawal of the mail through the front door opening of the receptacle 5. If desired the partition sections may be provided with a finger opening 19 for facilitating operation of the same and a thumb notch 20 may also be provided for facilitating this operation. A handle 21 may be provided upon one end of the flap 13 for convenience in raising the said flap.

In operation, the door 8 may be left open for permitting the milkman to insert the bottle of milk through the top of the receptacle 5 after which he will close said door 8 and access to the interior of the receptacle 5 by an unauthorized person will be prevented by the locking of the cover 8 automatically upon closing of the same through the instrumentality of the spring catch 9, the door 6 having been previously locked by means of a key manipulating the locking device 7. When the consumer wishes to withdraw the bottle of milk from the receptacle, the same may be done by simply unlocking the device 7 and opening the door 6. When the milk bottle has been removed the latch 9 is released and the cover 8 reset to an open position, whereupon the door 6 is again closed and locked. When the postman delivers mail, he will open the flap 13 and insert the mail through the slot 12 and with the partition sections adjusted as shown in Fig. 6, the mail will be held against falling inwardly to the milk bottle receiving compartment. With the door 6 open, the section 16 may be shoved upwardly and they will automatically be held in raised position for permitting ready withdrawal of the mail through the opening closed by the door 6. By pressing inwardly upon the partition sections 16, the pins 18 may be disengaged from the ratchet teeth 15 and said sections may then be again lowered to the position of Fig. 6 for reception of further mail.

From the foregoing description it is believed that the construction and operation as well as the advantages of the present invention will be readily understood and appreciated by those skilled in the art.

Minor changes may be made in the invention without departing from the spirit and scope thereof as claimed.

What is claimed as new is:—

1. In combination with a milk bottle receptacle having top and front doors respectively provided with automatic and key actuated locking devices, the automatic locking devices being operable to automatically lock the top door upon closing of the latter and releasable only from the interior of the receptacle when the front door is open, the top of said receptacle being provided with a mail receiving slot leading into the interior of said receptacle, of a pair of vertically slidable partition sections dividing said receptacle into a rear mail receiving compartment, and means to retain said partition sections in any desired vertically adjustable position whereby the mail may be prevented from falling into the milk bottle compartment of the receptacle and whereby said partition sections may be elevated for permitting ready withdrawal of the mail from the front door opening of said receptacle.

2. In combination with a milk bottle receptacle having top and front doors respectively provided with automatic and key actuated locking devices, the automatic locking devices being operable to automatically lock the top door upon closing of the latter and releasable only from the interior of the receptacle when the front door is open, the top of said receptacle being provided with a mail receiving slot leading into the interior of said receptacle, of a pair of vertically slidable partition sections dividing said receptacle into a rear mail receiving compartment, means to retain said partition sections in any desired vertically adjustable position whereby the mail may be prevented from falling into the milk bottle compartment of the receptacle and whereby said partition sections may be elevated for permitting ready withdrawal of the mail from the front door opening of said receptacle, the side walls of said receptacle being provided with inwardly projecting guide flanges vertically disposed to engage the ends of said partition sections, and the means for retaining the partition sections in adjusted positions including ratchet teeth upon the rear faces of said flanges and pins upon the ends of said partition sections engaging said ratchet teeth.

3. In combination with a milk bottle receptacle having top and front doors respectively provided with automatic and key actuated locking devices, the automatic locking devices being operable to automatically lock the top door upon closing of the latter and releasable only from the interior of the receptacle when the front door is open, the top of said receptacle being provided with a mail receiving slot leading into the interior of said receptacle, of a pair of vertically slidable partition sections dividing said receptacle into a rear mail receiving compartment, means to retain said partition sections in any desired vertically adjustable position whereby the mail may be prevented from falling into the milk bottle compartment of the receptacle and whereby said partition sections may be elevated for permitting ready withdrawal of the mail from the front door opening of said receptacle, the side walls of said receptacle being provided with inwardly projecting guide flanges vertically disposed to engage the ends of said partition sections, and the means for retaining the partition sections in adjusted positions including ratchet teeth upon the rear faces of said flanges and pins upon the ends of said partition sections engaging said ratchet teeth, and yieldable means carried by said partition sections to maintain the latter spaced from the rear wall of said receptacle with their ends contacting said guide flanges and with the pins engaging said ratchet teeth.

In testimony whereof I affix my signature.

JOZSEPH HORVÁTH.